United States Patent [19]

Shinozaki et al.

[11] Patent Number: 4,678,707
[45] Date of Patent: Jul. 7, 1987

[54] VIBRATION DAMPING COMPOSITE LAMINATE

[75] Inventors: Masatoshi Shinozaki, Mobara; Yoshihiro Matsumoto, Chiba; Yoshiki Aoyagi, Yokohama; Kazuhisa Kojima, Machida, all of Japan

[73] Assignee: Kawasaki Steel Corporation, Hyoga, Japan

[21] Appl. No.: 749,018

[22] Filed: Jun. 26, 1985

[30] Foreign Application Priority Data

Jun. 29, 1984 [JP] Japan ................... 59-134737

[51] Int. Cl.[4] .............. B32B 5/16; B32B 15/08; B32B 27/42
[52] U.S. Cl. .................... 428/323; 428/408; 428/460; 428/461
[58] Field of Search ............ 428/244, 460, 461, 323, 428/408

[56] References Cited

U.S. PATENT DOCUMENTS

| | | | |
|---|---|---|---|
| 4,062,997 | 12/1977 | Hotta et al. | 428/378 |
| 4,210,564 | 7/1980 | Pouchol | 260/29.6 B |
| 4,265,789 | 5/1981 | Christopherson et al. | 252/511 |
| 4,367,113 | 1/1983 | Karim et al. | 156/327 |
| 4,463,054 | 7/1984 | Nelson | 428/458 |

FOREIGN PATENT DOCUMENTS

| | | |
|---|---|---|
| 56-84950 | 7/1981 | Japan . |
| 58-53438 | 3/1983 | Japan . |
| 59-124847 | 7/1984 | Japan . |

OTHER PUBLICATIONS

Rosin–Rammler, "Journal of the Institute of Fuel", Oct. 1933, pp. 29–36.
Perry et al., "Perry's Chemical Engineers' Handbook", 6th Edition, pp. 8-5 through 8-9.

Primary Examiner—John F. Terapane
Assistant Examiner—Eric Jorgensen
Attorney, Agent, or Firm—Austin R. Miller

[57] ABSTRACT

Disclosed is a vibration damping composite laminate of the type comprising a viscoelastic polymer composition layer interposed between two layers of metal, which is high in the damping effectiveness and can readily be spot-welded to metal structures. Essentially the polymer composition is a blend of a polyvinyl acetal resin and particulate carbon which amounts to 10–80 wt % of the composition, on condition that the ratio of the mean particle size of the particulate carbon to the thickness of the polymer composition layer is from 0.5 to 1.7. Optionally the polymer composition may further comprise a polyolefine resin and/or a plasticizer.

15 Claims, 1 Drawing Figure

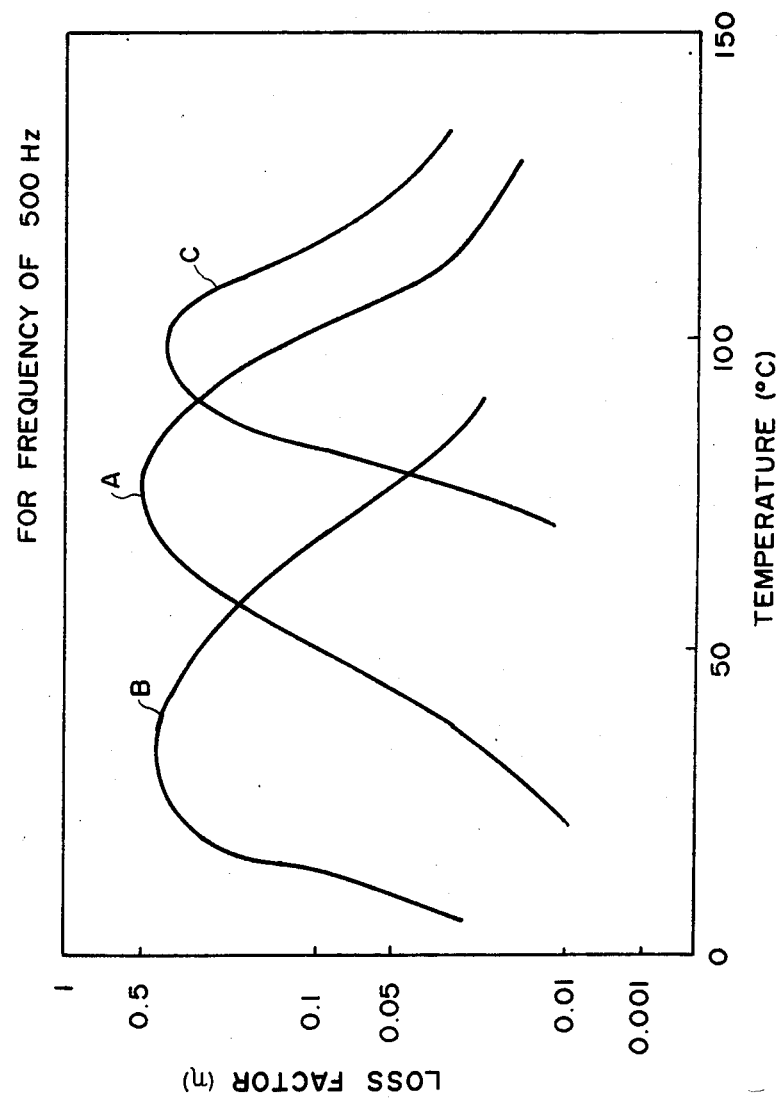

4,678,707

VIBRATION DAMPING COMPOSITE LAMINATE

BACKGROUND OF THE INVENTION

This invention relates to a vibration damping composite laminate of the constrained layer damping type comprising two layers of metal and a layer of a viscoelastic polymer composition closely interposed between the metal layers, wherein the polymer composition has electrical conductivity so that the laminate can be spot-welded to metal structures.

Nowadays noises emitted from industrial machinery and structures and road vehicles have become a serious social problem, and therefore there is a keen demand for noise suppressing or reducing measures in various aspects. So far the prevailing practice of noise suppression or reduction is to use several kinds of functionally different materials such as sound insulating materials, sound absorbing materials, vibration-proof materials and vibration damping materials in selected combinations.

Meanwhile, in the current automobile industry another matter of great concern is reduction in the car weight to cope with severer standards of fuel mileage and the energy supply problem in the near future. Accordingly there is an increasing trend toward the reduction in the thicknesses of steel sheets for various panels in the car body and also toward the substitution of steel materials by lightweight materials such as aluminum alloys and plastics. Since such measures for reduction in weight lead to increasing vibrations of automobiles and, hence, to the emission of greater noise, it has become a task of great importance to develop effective and practical means to reduce vibrations automobiles.

The outcome of recent research and development in the vibration suppressing techniques includes some vibration-proof alloys and vibration damping composite structures produced by pasting a vibration damping polymeric material to a metal base or by sandwiching a viscoelastic polymer between two layers of metal. In general, a measure of the damping efficiency of a vibration damping material is chosen from loss factor ($\eta$), logarithmic decrement ($\Delta$) and sharpness of resonance (Q), which are interrelated physical characteristic values. Among these characteristic values, loss factor ($\eta$) is most frequently employed. Until now it has been accepted that the effect of damping vibrations is appreciable if loss factor takes a value greater than about 0.05, but the development of vibration damping materials that exhibit greater loss factor values is wanted as the noise regulations have been tightened.

In vibration damping composite materials of the constrained layer damping type produced by closely interposing a polymer layer between two metal layers, the loss factor is significantly dependent on temperature and peaks at a certain temperature. Therefore, it is necessary to selectively use a polymer which is suited to the temperature range in which the vibration damping material is to be used. Our past studies have revealed the possibility of adjusting the temperature at which the loss factor becomes maximum by using a suitable plasticizer or differently working additive. Nevertheless, it is a matter of course that a truly good vibration damping material is one which is high loss factor and is inherently low in the dependence of its damping effectiveness on temperature. Also it is accepted that a vibration damping material high in the value of loss tangent (tan $\eta$) is advantageous.

Another type of vibration damping composite laminates is the extensional damping type. A laminates of this type consists of a metal base layer and a viscoelastic polymer layer which adheres to the metal layer and exists as a "free-layer" with no constraining layer thereon. In general a polymer with high complex modulus ($E''$) is recommended for this use. However, recently vibration damping laminates of the constrained layer damping type are attracting greater interest because of comprising a relatively small quantity of polymer and being superior in vibration damping effectiveness.

From a practical point of view, vibration damping composite laminates are desired to be comparable to a steel sheet in physical properties other than vibration damping capability, and particularly in workability such as formability by bending or pressing and weldability. For applications to automobiles, spot-weldability is a particularly important factor. However, when the polymer layer in a vibration damping composite laminate lacks electrical conductivity as is usual, spot welding of such a laminate to a metal structure is difficult. If spot welding is wished, there is the need of taking a certain measure such as providing an extra short-circuiting or by-passing circuit or locally deforming the laminate by a punch so as to bring the two metal layers of the laminate into contact with each other in advance of the welding operation.

To obviate such troublesome measures, it has been proposed to render the polymer layer in a vibration damping composite laminate electrically conductive by the addition of a conductive material to the polymer, e.g. in Japanese patent applications provisional publication Nos. 50-79920, 53-128687 and 57-146649. However, the composite laminates according to these proposals are relatively low in loss factor.

As a viscoelastic polymer composition effective for damping vibrations of metal structures, Japanese patent application publication No. 54-23489 proposes a blend of a polyvinyl acetal resin and a plasticizer. However, the inclusion of a relatively large amount of plasticizer results in lowering of the strength of adhesion of the polymer layer to the metal layers of the composite laminate.

SUMMARY OF THE INVENTION

It is an object of the present invention to provide a vibration damping composite laminate of the constrained layer damping type, which is excellent in vibration damping effectiveness and also in workability and can readily be spot-welded to a metal structure.

The present invention provides a vibration damping composite laminate comprising two layers of a metal in parallel arrangement and a layer of a viscoelastic polymer composition which is closely interposed between the two metal layers and comprises a polyvinyl acetal resin and particulate carbon which amounts to 10–80 wt% of the polymer composition. In this composite laminate, the ratio of the mean particle size of the particulate carbon determined by using the Rosin-Rammler's distribution equation to the thickness of the polymer composition layer must be in the range from 0.5 to 1.7.

In this composite laminate, the polymer composition may further comprise a polyolefine resin on condition that the proportion of the polyolefine resin to the polyvinyl acetal resin is not more than 1:1 by weight.

Whether a polyolefine resin is used or not, the polymer composition may comprise 5–200 parts by weight, and preferably 5–60 parts by weight, of plasticizer per 100 parts by weight of the polyvinyl acetate resin.

It is known that particulate carbon is useful as a conductive material to be blended with a polymer. However, the present invention does not reside in merely using particulte carbon as a conductive material. This invention is based on our discovery that blending of particulate carbon having an appropriate average particle size with a specific polymer, i.e. polyvinyl acetal, gives a viscoelastic and electrically conductive polymer composition which is remarkably high in vibration damping capability and also in strength of adhesion to metals even when a relatively large amount of plasticizer is added. There are various conductive filler materials other than particulate carbon, such as metal powders and carbon fiber. However, such conductive materials are inferior to particulate carbon in dispersibility in polymers and do not give highly effective vibration damping materials even when blended with polyvinyl acetal. Also it is essential to use polyvinyl acetal. Blending of particulate carbon with any other polymer does not give a vibration damping material comparable in loss factor to the one according to the invention.

Besides very high loss factor values, a vibration damping composite laminate according to the invention has many advantages such as good formability by bending or drawing, ease of spot-welding to metal structures and the possibility of adjusting the temperature at which the loss factor peaks over a wide range of temperature extending from room temperature to about 150° C. without significantly impairing other properties.

In this invention, a mean particle size of particulate carbon is determined by examining particle size distribution and by using the Rosin-Rammler's distribution equation.

$$R = 100 \exp(-D_p/D_{p0})^n (\%)$$

wherein n is a constant, and $D_{p0}$ is a particle size at which R becomes 36.8%.

The value of $D_p$ when R becomes 50% is taken as the mean particle size of particulate carbon before mixing it with the polyvinyl acetal resin or any other component of the viscoelastic polymer composition.

A composite laminate of the invention may be entirely flat or may be at least partially curved.

BRIEF DESCRIPTION OF THE DRAWING

The single FIGURE is a graph showing the dependence of loss factor on temperature for three kinds of vibration damping laminates produced as examples of the invention.

DESCRIPTION OF THE PREFERRED EMBODIMENTS

In general, a polyvinyl acetal resin as the viscoelastic material in the present invention is obtained by acetalizing polyvinyl alcohol with an aldehyde, while polyvinyl alcohol is produced by saponification of polyvinyl acetate. Therefore, a polyvinyl acetal resin is a copolymer containing vinyl alcohol group and vinyl acetate group besides vinyl acetal group. When formaldehyde is used in acetalization the product is commonly called formal resin, and when butyl aldehyde is used the product is commonly called butyral resin.

In this invention it is suitable to use a polyvinyl acetal resin of which average degree of polymerization is in the range from 300 to 5000 and in which the degree of acetalization is in the range from 50 to 85 mol%. It is possible to use any kind of polyvinyl acetal resin such as polyvinyl butyral, polyvinyl formal, polyvinyl acetoacetal or polyvinyl propylacetal. However, it is preferable to use either polyvinyl butyral resin or polyvinyl formal resin.

The kind of the polyolefine resin is not particularly specified. For example, low density, medium density or high density polyethylene, polypropylene or a random or block copolymer of ethylene with propylene or any other α-olefine having 3 to 10 carbon atoms may be used. If desired, a mixture of polyolefine resins may be used. It is desirable to select a polyolefine resin which is high in loss tangent (tan η) over the temperature range of 0°–100° C. For example, it is desirable that the maximum value of tan η of the polyolefine resin is above 1.0 when measured with Rheovibron, a viscoelasticity tester of Toyo Baldwin Co. In this regard, examples of preferable polyolefine resins are low density and medium density polyethylene having a density of 0.910–0.945 g/cm$^3$, copolymers of ethylene with an α-olefine having 3 to 10 carbon atoms having a density of 0.880–0.910 g/cm$^3$ and modified polyolefines obtained by addition reaction of a polyolefine with an α,β-unsaturated carboxylic acid or its anhydride, including various mixtures thereof.

A modified polyolefine of the aforementioned type can be prepared by subjecting a mixture of a selected polyolefine resin and a selected unsaturated carboxylic acid or its anhydride to grafting reaction by a known method. For the grafting reaction the employment of a melt kneading method is favorable from an economical point of view, though the object can be accomplished also by a solution method or a slurry method. In the case of the melt kneading method, high grafting rate can be attained and a modified polyolefine of good hue can be obtained without forming a large amount of gel-like substance by mixing 0.03–1 wt% of an unsaturated carboxylic acid or its anhydride and not more than 0.1 wt%, and preferably 0.001–0.05 wt%, of an organic peroxide with the selected polyolefine resin and kneading a melt of the resultant mixture at 120°–300° C. Examples of unsaturated carboxylic acids suitable for this method are maleic acid, acrylic acid and their anhydrides.

The temperature at which the loss factor η of a viscoelastic material according to the invention, which may or may not comprise a polyolefine resin, becomes maximum can be adjusted by the addition of a suitable plasticizer. A wide selection can be made from the commonly used plasticizers including phthalic acid esters such as dibutyl phthalate, dioctyl phthalate and butylbenzyl phthalate, phosphoric esters such as tricresyl phosphate, fatty acid esters such as dibutyl sebacate, di-2-ethylhexyl adipate and dibutyl succinate, glycol derivatives such as triethylene glycol dibutylate and vegetable oils such as soybean oil, linseed oil and castor oil and their epoxides.

Besides the adjustment of the temperature at which maximum vibration damping occurs, the addition of a plasticizer is effective for improving the formability of the viscoelastic material since polyvinyl acetal resins, which readily undergo cross-linking when heated, are rather inferior in formability. However, if an excessively large amount of plasticizer is used the viscoelastic material becomes low in strength of adhesion to metal sheets. Therefore, the amount of plasticizer is limited within the range from 5 to 200 parts by weight, and preferably within the range from 5 to 60 parts by weight, per 100 parts by weight of polyvinyl acetal resin.

As the particulate carbon incorporated in the viscoelastic material according to the invention, it is possible to use a powder of synthetic graphite or natural graphite, carbon black, active carbon or milled carbon fiber. In a vibration damping laminate of the invention, particulate carbon occupies 10–80 wt%, and preferably 20–60 wt%, of the viscoelastic polymer layer, and the particle size of the particulate carbon is controlled such that the ratio of the mean particle size D of carbon to the thickness t of the viscoelastic polymer layer is in the range from 0.5 to 1.7, and preferably in the range from 0.8 to 1.2. If the ratio D/t is below 0.5 or the content of particulate carbon is less than 10 wt%, the electric conductivity of the viscoelastic polymer layer as a whole remains insufficient. On the other hand, if the ratio D/t is above 1.7 or the content of particulate carbon is more than 80 wt%, the vibration damping effectiveness of the viscoelastic polymer layer becomes low and good dispersion of the particulate carbon becomes difficult.

Besides particulate carbon as an essential ingredient, a small amount of any other kind of inorganic filler may optionally be added for the purpose of improving a certain property of the viscoelastic polymer composition, such as modulus of elasticity or adhering property. For example, flake graphite, mica, talc and/or magnesium carbonate may be added.

A viscoelastic polymer composition according to the invention is prepared by blending and well mixing all the ingredients by a conventional method for obtaining a plastic blend, such as a melt kneading method.

As to the metal sheets in a vibration damping laminate of the invention, it is most suitable to use a steel sheet with consideration of various factors such as cost, strength and ease of adhesion to the viscoelastic polymer composition. However, this is not limitative, and there is no problem in using a different kind of metal sheet such as copper sheet, aluminum sheet or a suitable nonferrous alloy sheet. When using a steel sheet a wide selection can be made from mild steel sheets, high strength steel sheets, stainless steel sheets and surface treated steel sheets represented by galvanized steel sheets. Where necessary, the selected steel sheet may preliminarily be subjected to a conventional surface treatment such as a phosphate treatment or a chromate treatment. In every case, cleansing of each metal sheet surface is necessary for accomplishment of best adhesion of the metal sheet to the viscoelastic polymer layer. For this purpose a physical treatment such as sand blasting may be made according to the need, besides the usual degreasing and cleansing with chemicals.

In producing a vibration damping laminate of the invention, the metal sheets are heated together with the viscoelastic polymer composition and sometimes, depending on the intended shape of the laminate, are subjected to bending or drawing. If a steel sheet that is high in the tendency to aging is used, so-called stretcher strains will appear on the surfaces of the steel sheets after working so that the appearance of the obtained laminate may be impaired. Therefore, it is suitable to use a non-aging type steel sheet of which the aging index (A.I.) is not greater than 1.5 kgf/mm$^2$ particularly when great importance is attached to the appearance of the laminate or the metal sheets after shaping.

Using the above described materials, a vibration damping laminate of the invention is produced by using a known method. For example, in the case of a simple press method a provisional laminate of two sheets of metal and an interposed layer of the viscoelastic polymer composition is pressed while kept heated at a temperature above the melting point of the polymer composition. It is possible to employ any other suitable method such as an extrusion laminating method, in which two sheets of metal in a parallel arrangement are fed to rolls while the polymer composition in melted state is extruded in a sheet form from an extruder and is forced to enter the space between the two metal sheets, or a coating laminating method in which a solution of the polymer composition in an organic solvent is applied to a metal sheet and then heated into a melt state preceded by dissipation of the solvent, and then another metal sheet is placed on and pressed against the melted polymer composition layer.

The shape and thickness of the metal sheets are variable depending on the design of the vibration damping laminate. In most cases the laminate of the invention is of a three-layer structure consisting of two sheets of metal and a viscoelastic polymer composition layer interposed between the two metal sheets. In such cases, it suffices that each metal sheet has a thickness not smaller than 0.01 mm on condition that the thickness of the polymer composition layer is not smaller than 1/20 of the metal sheet thickness. Usually the two metal sheets have the same thickness, but it is also possible to combine two differently thick metal sheets. A vibration damping laminate according to the invention is not necessarily of the three-layer structure and may consist of three or more sheets of metal and two or more layers of the electrically conductive viscoelastic polymer composition.

The invention will further be illustrated by the following nonlimitative examples.

EXAMPLE 1

An ordinary cold-rolled steel sheet having a thickness of 0.6 mm was used as the metal base material of a vibration damping laminate. The aging index of this steel sheet was 0 kgf/mm$^2$. The steel sheet was cut into two 250 m×250 mm square pieces, which were degreased with alkali.

To prepare a viscoelastic polymer composition, 100 parts by weight of polyvinyl butyral resin, 20 parts by weight of epoxidized soybean oil as a plasticizer and 45 parts by weight of a synthetic graphite powder having a mean particle size (D) of 90 $\mu$m were thoroughly mixed in a ribbon blender. The degree of polymerization of the polyvinyl butyral resin was 1050, and the degree of butyralization was 81 wt%. Using a single-screw extruder, the mixture was melted and kneaded at 200° C. and extruded into pellets. In a 100-ton hot press, the pellets of the polymer composition was processed into a 300 mm×300 mm square sheet having a thickness of 90 $\mu$m. This polymer composition sheet was sandwiched between the aforementioned two pieces of steel sheet, and the resultant provisional laminate was put into a hot press. After preheating at 170° C. for 3 min for the purpose of degassing, pressure was applied to the provisional laminate for 3 min while the temperature was kept at 170° C. As the result, a vibration damping laminate having a total thickness of 1.29 mm was obtained.

For this vibration damping laminate, the dependence of loss factor $\eta$ on temperature was examined by using a complex modular apparatus placed in a controlled temperature chamber. At variously controlled temperatures, measurements were made by varying the vibration frequency to determine the loss factor from the sharpness of resonance of mechanical impedance. In the FIGURE of the drawing, the curve A represents the result of the examination. As can be seen in the FIGURE, the temperature at which the loss factor $\eta$ of the sample of Example 1 became maximum was 75° C., and the maximum absolute value $\eta_{max}$ of loss factor was 0.51.

In the vibration damping laminate of Example 1, the strength of adhesion between the viscoelastic polymer layer and each steel sheet was measured by a peel strength test according to JIS K 6854. The test was carried out at 20° C. and at a peeling speed of 10 mm/min. The peel strength of the sample was found to be 9.6 kg/cm.

The spot-weldability of the vibration damping laminate was examined by operating a direct spot-welding machine under nearly the same conditions as in the cases of welding ordinary steel sheets without using any extra means such as a by-pass circuit. Direct spot-welding of the laminate of Example 1 to a mild steel sheet of nearly the same thickness was surely accomplished without difficulty and without failure.

The vibration damping laminate of Example 1 was subject to test deep drawing into a cylindrical shape. It was found that the limit drawing ratio (ratio of blank diameter to punch diameter) of this laminate was as high as 2.2 and accordingly was comparable to that of a sheet of super deep drawing steel.

EXAMPLE 2

The viscoelastic polymer composition of Example 1 was modified by using 100 parts by weight of a polyvinyl butyral resin of which average degree of polymerization was 300 and in which the degree of butyralization was 78 wt% in place of the polyvinyl butyral resin used in Example 1 and 55 parts by weight of dioctyl phthalate as a plasticizer in place of the epoxidized soybean oil in Example 1.

Except the changes in these points, the manufacturing process of Example 1 was repeated to obtain another vibration damping laminate according to the invention. This laminate was subjected to the tests described in Example 1.

In the FIGURE, the curve B represents the dependence of loss factor $\eta$ of this vibration damping laminate on temperature. As can be seen, in this case the temperature at which the loss factor $\eta$ became maximum was 30° C., and the maximum absolute value $\eta_{max}$ of loss factor was 0.46. In this laminate, the peel strength was 5.2 kg/cm. In deep drawing into a cylindrical shape, the limit drawing ratio of this laminate was 2.3. In the spot-welding test, direct spot-welding of this laminate to a mild steel sheet of nearly the same thickness was surely accomplished without difficulty and without failure.

EXAMPLE 3

A viscoelastic polymer composition was prepared by blending 100 parts by weight of a polyvinyl butyral resin, 6 parts by weight of a modified polyethylene resin, 10 parts by weight of epoxidized soybean oil and 45 parts by weight of the synthetic graphite powder used in Example 1. The degree of polymerization of the polyvinyl butyral resin was 2030, and the degree of butyralization was 80 wt%. The modified polyethylene resin was obtained by subjecting a mixture of 100 parts by weight of high pressure processed low density polyethylene, 0.36 part by weight of maleic anhydride and 0.020 part by weight of $\alpha-\alpha$ bis-tert-butylperoxy paradiisopropylbenzene to grafting reaction. The modified polyethylene resin contained 0.34 wt% of maleic anhydride in grafted state and had a density of 0.91 g/cm$^3$ and a melt index of 2.1 g/10 min. The blend was melted and kneaded in an extruder at 210° C. and then extruded into pellets.

By using the viscoelastic polymer composition and the steel sheets described in Example 1, a vibration damping laminate was produced by the same method as in Example 1. The laminate was subjected to the tests described in Example 1.

In the FIGURE, the curve C represents the dependence of loss factor $\eta$ of this vibration damping laminate on temperature. In this case the temperature at which the loss factor $\eta$ became maximum was 100° C., and the maximum absolute value $\eta_{max}$ of loss factor was 0.51. The peel strength was 7.2 kg/cm. In deep drawing into a cylindrical shape, the limit drawing ratio of the laminate was 2.1. In the spot-welding test, direct spot-welding of this laminate to a mild steel sheet of nearly the same thickness was surely accomplished without difficulty and without failure.

As can be seen in the FIGURE, the vibration damping laminates according to the invention exhibited loss factor values higher than 0.4 over a wide range of temperature. In hitherto proposed vibration damping laminates using a polymer layer comprising an electrically conductive material, loss factor was about 0.3 at the highest as shown in Japanese patent application provisional publication No. 57-146649. That is, a vibration damping laminate accoroading to the invention is advantageous not only in having good electrical conductivity but also in exhibiting incomparably high loss factor values.

COMPARATIVE EXAMPLE 1

The viscoelastic polymer composition of Example 1 was modified by using a synthetic graphite powder having a mean particle size (D) of 70 μm in place of the graphite powder in Example 1 and decreasing the content of the graphite powder in the polymer composition to 9 wt%. In this case the polymer composition was shaped into a sheet having a thickness of 150 μm.

By using the thus modified viscoelastic polymer composition and the steel sheets described in Example 1, a vibration damping laminate was produced by the method described in Example 1. The total thickness of the laminate was 1.35 mm. The laminate was subjected to the tests described in Example 1.

In this case the temperature at which loss factor $\eta$ became maximum was 74° C., and the maximum absolute value $\eta_{max}$ of loss factor was 0.56. In this laminate the peel strength was 8.9 kg/cm. However, in the spot-welding test, it was difficult to surely accomplish direct spot-welding of this laminate to a mild steel sheet.

When the content of the same graphite powder in the polymer composition was increased to 85 wt% the spot-weldability of the vibration damping laminate was satisfactory, but the maximum absolute value $\eta_{max}$ of loss factor decreased to only 0.27. The peel strength also decreased to only 3.1 kg/cm.

COMPARATIVE EXAMPLE 2

In place of the viscoelastic polymer composition of Example 1, an ethylene-vinyl acetate copolymer (EVA) containing no additive was sandwiched between the two steel sheets described in Example 1 to produce a laminate having a thickness of 1.29 mm. Another laminate was produced by the same method except that 30 parts by weight of a synthetic graphite powder having a mean particle size (D) of 70 μm was added to 100 parts by eight of EVA.

The maximum absolute value $\eta_{max}$ of the laminate produced by using EVA containing no additive was 0.26. However, $\eta_{max}$ of the laminate using the graphite containing EVA was only 0.02. This is demonstrative of our conclusion that the addition of particulate carbon to a polymer other than polyvinyl acetal does not provide a good vibration damping material.

What is claimed is:

1. A vibration damping composite laminate of the constrained layer damping type comprising:
   two layers of a metal in parallel arrangement; and
   a layer of a viscoelastic polymer composition which is closely interposed between the two metal layers and comprises a polyvinyl acetal resin blended with particulate carbon in an amount of 10 to 80% of the polymer composition, the ratio of the mean particle size of said particulate carbon to the thickness of the polymer composition layer being in the range from 0.5 to 1.7, said mean particle size being determined by the equation $R = 100 \exp(-D_p/D_{p0})^n (\%)$ wherein n is a constant determined by the type of particulate carbon being used and $D_{p0}$ is the particle size at which R becomes 36.8%, and wherein the value of $D_p$ when R becomes 50% is the mean particle size of the particulate carbon before mixing, said polymer being electrically conductive so that the laminate can be spot-welded to metal structures.

2. A composite laminate according to claim 1, wherein said ratio is in the range from 0.8 to 1.2.

3. A composite laminate according to claim 1, wherein said polyvinyl acetal resin is selected from the group consisting of polyvinyl butyral resin and polyvinyl formal resin.

4. A composite laminate according to claim 1, wherein said polyvinyl acetal resin is in the range from 300 to 5000 in average degree of polymerization and in the range from 50 to 85 mol% in the degree of acetalization.

5. A composite laminate according to claim 1, wherein said particulate carbon amounts to 20 to 60 wt% of the polymer composition.

6. A composite laminate according to claim 1, wherein said polymer composition further comprises not more than 100 parts by weight of a polyolefine resin per 100 parts by weight of said polyvinyl acetal resin.

7. A composite laminate according to claim 6, wherein the amount of said polyolefine resin is not more than 50 parts by weight per 100 parts by weight of said polyvinyl acetal resin.

8. A composite laminate according to claim 6, wherein said polyolefine resin is selected from the group consisting of polyethylene, polypropylene and copolymers of ethylene with an α-olefine having 3 to 10 carbon atoms.

9. A composite laminate according to claim 6, wherein said polyolefine resin is a modified polyolefine obtained by grafting an unsaturated carboxylic acid or its anhydride to a polyolefine selected from the group consisting of polyethylene, polypropylene and copolymers of ethylene with an α-olefine having 3 to 10 carbon atoms.

10. A composite laminate according to claim 1, wherein said polymer composition further comprises not more than 200 parts by weight of a plasticizer per 100 parts by weight of said polyvinyl acetal resin.

11. A composite laminate according to claim 10, wherein the amount of said plasticizer is in the range from 5 to 60 parts by weight per 100 parts by weight of said polyvinyl acetal resin.

12. A composite laminate according to claim 1, wherein said metal is a steel.

13. A composite laminate according to claim 1, wherein each layer of said metal has a thickness not smaller than 0.01 mm, the thickness of the polymer composition layer being not smaller than 1/20 of the thickness of each layer of said metal.

14. A composite laminate according to claim 1, wherein said two layers of said metal have substantially the same thickness.

15. A composite laminate according to claim 1, wherein said two layers of said metal are different in thickness.

* * * * *